T. SHARTS.

Improvement in Fire and Burglar-Proof Safes.

No. 5,112. Reissued Oct. 22, 1872.

Witnesses
C. Wahlers
Ernst Pilhuber

Inventor.
Theodor Sharts
per
Van Santvoord & Hauff atts

UNITED STATES PATENT OFFICE.

THEODORE SHARTS, OF NEW YORK, ASSIGNOR OF ONE-HALF INTEREST TO JOHN RYER, OF BROOKLYN, NEW YORK.

IMPROVEMENT IN FIRE AND BURGLAR PROOF SAFES.

Specification forming part of Letters Patent No. 20,736, dated June 29, 1858; extended seven years; reissue No. 5,112, dated October 22, 1872.

*To all whom it may concern:*

Be it known that I, THEODORE SHARTS, of the city, county, and State of New York, have invented a new and Improved Fire and Burglar Proof Safe; and I do hereby declare the following to be a full, clear, and exact description thereof, which will enable those skilled in the art to make and use the same, reference being had to the accompanying drawing forming part of this specification, in which drawing—

Figure 1:
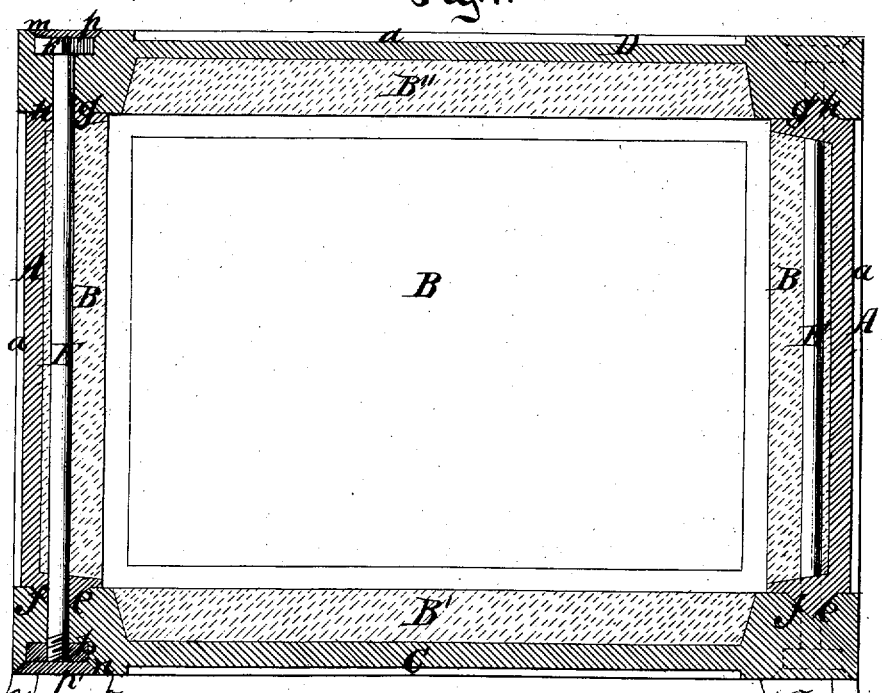
Figure 2:
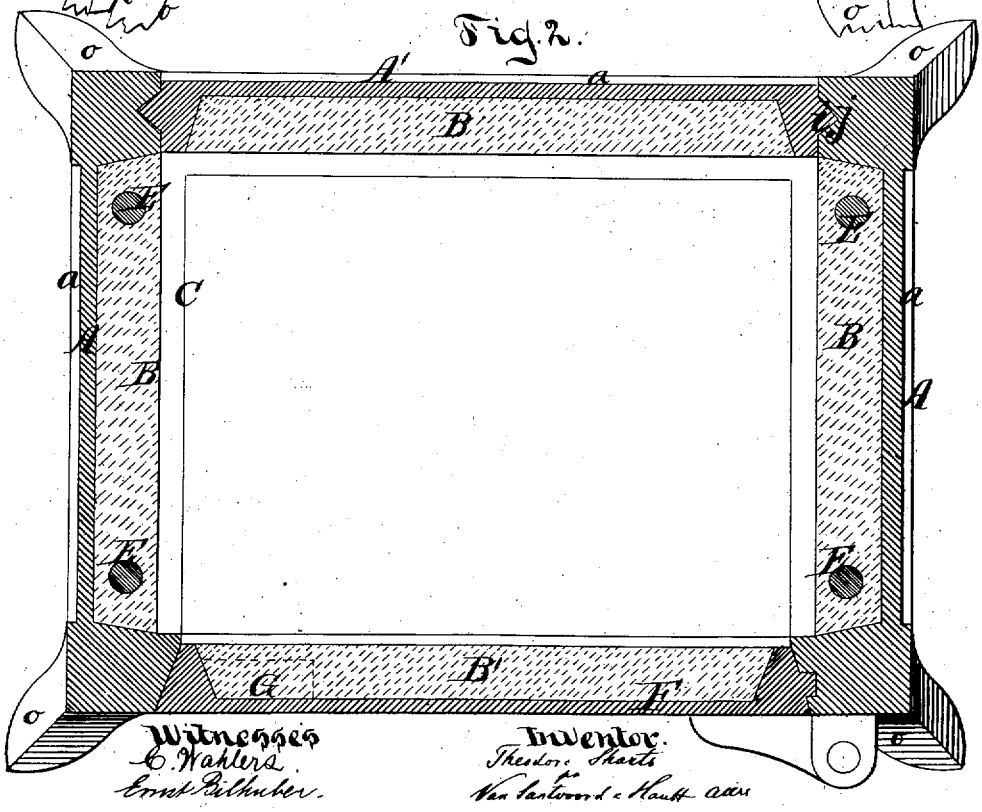

Figure 1 is a vertical central longitudinal section of a safe constructed with my improvements, and Fig. 2 is a horizontal section of the same.

Similar letters indicate corresponding parts.

This invention consists in a sectional safe, the sections being cast to fit to and to interlock with each other at their junction where they are fastened together by rods or bolts. The ends of the rods or bolts are hid from sight, and made inaccessible to burglars, which is accomplished by flowing molten metal over and around their ends. My improved safe can be constructed at comparatively small cost, which makes it convenient for family or domestic use, for instance as a depository of jewelry and small valuables which almost every family possesses.

To enable others skilled in the art to make and use my invention, I will proceed to describe its construction and operation.

The safe is of rectangular form, which probably would be the most desirable shape, and is constructed of cast-iron—that is to say, all but the "filling" or non-conducting material used to repel heat, and the bolts which keep the whole together. The letters A A A′ represent three sides of the safe, which are each cast with a recess, *a*, in the outer side in imitation of panels. The inner sides of the plates are cast with recesses which are much deeper than the outer recesses. The inner recesses are intended to receive the plaster of Paris B, or other substances known or used as a non-conductor of heat. Each side plate A A A′ is constructed precisely similar, and they are placed endwise on the bottom plate C, which is constructed precisely like the side plates A A A′, the "filling" being designated by B′. The top plate D is also constructed like the others, the letter B″ representing "filling" or non-conducting material. The sides and top and bottom plates are secured together as follows: Inside the bottom plate C near its edges, V-shaped grooves *e* are made, (see Fig. 1,) and these grooves receive corresponding projections *f* on the lower edges of the side plates A A A′. The upper edges of the side plates A A A′ have similar V-shaped projections *g* formed on them, and the projections fit into corresponding grooves *h* in the under side of the top plate D. The back-side plate A′ has V-shaped projections *i* at its ends, which fit in corresponding grooves *j* in the back part of the other two side plates A. (See Fig. 2.) The letter E designates bolts, which pass through the side plates A A and top and bottom plates C D. The heads *k* of these bolts fit in countersunk recesses *m* in the upper surface of the top plate D, and are covered by flowing melted metal over and around the same, as shown, at *p p*, and on the bottoms of the bolts nuts *l* are placed, said nuts fitting in countersunk recesses in the bottom plate C, and being hid from view by flowing melted metal over and around the same, as shown at *p′ p′*. The plates A A and C D being thus secured together by the bolts, the back plate A′ will consequently be secured by the grooves and projections, which form locks at its top, bottom, and sides, as described. F represents the door, which is constructed similar to the side plates A A A′, and is furnished with filling B. The door is hinged to the safe by one edge, and provided with a lock, G, at the other. The bottom plate C is provided with proper feet *o*. The safe by being filled in with plaster of Paris will be perfectly fire-proof, as is well known, and owing to the ends of the screw-bolts and the screw-nuts being covered and rendered invisible by the flowing of metal round and over the same, it is burglar-proof, as all access to the same so as to separate the sections is shut off, unless the covering metal is removed first; and consequently my safe is made secure against burglars.

What I claim as new, and desire to secure by Letters Patent, is—

1. A cast-iron safe made in sections, provided with interlocking joints, and held together by rods or bolts, substantially as described.

2. A sectional cast-iron safe, which has the junction between its sections accomplished by means of tongues and grooves *g h i j f e*, and maintained by means of screw-rods E E, which have their ends entirely hid from sight, and made inaccessible to burglars by flowing melted metal *p p'* over and around the same, substantially as set forth.

This specification signed by me August 14, 1872.

THEODORE SHARTS.

Witnesses:

J. VAN SANTVOORD,

E. F. KASTENHUBER.